(12) United States Patent
Hunzinger

(10) Patent No.: US 6,961,543 B2
(45) Date of Patent: Nov. 1, 2005

(54) PILOT PHASE MEASUREMENT ERROR ESTIMATOR FOR POSITION LOCATION

(75) Inventor: Jason F. Hunzinger, Carlsbad, CA (US)

(73) Assignee: DENSO Corporation, Kariya (JP)

( * ) Notice: Subject to any disclaimer, the term of this patent is extended or adjusted under 35 U.S.C. 154(b) by 724 days.

(21) Appl. No.: 10/075,897

(22) Filed: Feb. 12, 2002

(65) Prior Publication Data

US 2002/0142726 A1 Oct. 3, 2002

Related U.S. Application Data

(60) Provisional application No. 60/269,282, filed on Feb. 14, 2001.

(51) Int. Cl.[7] .............................................. H04B 17/00
(52) U.S. Cl. .................. 455/67.11; 455/65; 455/67.16; 370/342; 342/357.02
(58) Field of Search ........................ 455/456.1, 456.5, 455/456.6, 67.11, 65, 67.16; 370/342, 335, 337; 342/357.02, 357.06; 701/214

(56) References Cited

U.S. PATENT DOCUMENTS 6,289,280 B1 * 9/2001 Fernandez-Corbaton et al. .......................... 701/214
6,556,832 B1 * 4/2003 Soliman ................ 342/357.06

OTHER PUBLICATIONS

Pent et al., "Method for Positioning GSM Mobile Stations using Absolute Time Delay Measurements", IEEE vol. 33, No. 24, No 1997, pps. 2019–2020.*

* cited by examiner

Primary Examiner—Charles N. Appiah
(74) Attorney, Agent, or Firm—Harness, Dickey & Pierce, PLC

(57) ABSTRACT

A wireless communication system computes the pilot phase measurement RMSE directly by determining the path width as measured by the searcher component of the modem, the path drift over time, and the measurement resolution. The path width may be based on a measurement error that is half the path width or the larger of the distances from the local maxima to the earliest or latest side. Optionally, the distance from the peak to the 3 dB-down point can be used if the search resolution permits such measurement. The path drift is multiplied with the uncertainty in the measurement time stamp to get an error. This error is added to the measurement error due to path width. The measurement resolution is also added to the error.

19 Claims, 5 Drawing Sheets

PILOT PHASE MEASUREMENT ERROR ESTIMATOR FOR POSITION LOCATION

CROSS-REFERENCE TO RELATED APPLICATIONS

This application claims benefit of U.S. Provisional application No. 60/269,282, filed Feb. 14, 2001, the content of which is herein incorporated by reference in its entirety.

TECHNICAL FIELD

This invention relates to wireless communication systems, and more particularly to providing a system that improves the estimation of pilot phase measurement errors and results.

BACKGROUND

Wireless communication systems may operate using fixed infrastructure equipment or in ad-hoc configurations. In fixed infrastructure models, wireless communication systems typically comprise a plurality of base stations and mobile stations that communicate using an over-the-air communication protocol using physical layer technologies such as Code Division Multiple Access (CDMA) technology. IS-95, Mobile Station-Base Station Compatibility Standard for Dual-Mode Wideband Spread Spectrum Cellular System, published in July 1993 is an example of such a protocol standard. CDMA uses digital spread spectrum techniques that are less susceptible to interference.

Wireless communications systems such as CDMA typically operate using a variety of channels. In CDMA, for example, channelization is accomplished using orthogonal or quasi-orthogonal codes. Different channels generally have different purposes. Common channels are used to communicate to a plurality of mobile stations or base stations at the same time while dedicated channels are typically used for communication to and from one mobile station.

Pilot channels are channels that are typically receivable by a plurality of mobile stations for use in pilot set maintenance (selection of serving sector(s)) and coherent demodulation. Pilot channels can also be used for timing and phase measurements for geo-location purposes.

Wireless communication systems are beginning to incorporate network-based and network-assisted location determination systems. Some wireless handsets have network assisted GPS capability, some have Forward Link Trilateration capabilities, while others have hybrid capabilities that may use multiple technologies. Some CDMA wireless handsets make use of the wireless communication signals themselves to perform location-related measurements such as in Enhanced Forward Link Trilateration (EFLT) or Advanced Forward Link Trilateration (AFLT) methods that use the difference in phase delays of wireless signals as input to location calculations. Other wireless communication systems, such as some telematics products incorporate stand-alone capabilities such as GPS. An example of a hybrid system is one in which a mobile station has assisted-GPS receiver capabilities and AFLT measurement capabilities.

Location information can be used to enable location-based services. Similarly, location-based services can be network or terminal based or distributed between wireless communication system entities. Distributed or network based services generally require active communication and use of wireless resources such as communication channels. For example, the TIA/EIA location protocol standard IS-801 enables network-assisted GPS via messaging over the CDMA wireless link between infrastructure and terminals. Such resources may be expensive, limited and have quality of service impacts on usage such as moderate or high latency.

Hybrid systems such as terminals with assisted-GPS (AGPS) and AFLT capability may use measurements from both GPS and AFLT in combination to solve for the terminal position. Typically the uncertainty in the GPS and AFLT measurements may be different and thus, for best results, the measurements should be weighted inversely proportional to the uncertainty of the measurement. For example, if for a certain terminal at a certain time, the AFLT measurements have greater uncertainty than the GPS phase measurements then the GPS measurements may be given more importance (weight) in the computation of the terminal location solution.

What is needed is a system that measures pilot phase root mean square error for the purpose of determining how much relative importance to give individual measurements relative to each other and relative to other technologies such as GPS.

The IS-801 standard supports communication of pilot phase measurements with RMSE (root mean square error) estimates and hybrid systems call for reliable uncertainty (RMSE) estimates. Currently known methods use the energy of the pilot to estimate RMSE or the age of the measurement. The older the measurement the larger the RMSE, and similarly, typically the weaker the pilot strength, the larger the RMSE.

What is needed is a system which more accurately computes the RMSE for use in position location or any other applications.

SUMMARY

The present invention computes the pilot phase measurement RMSE directly by determining the path width as measured by the searcher component of the modem, the path drift over time, and the measurement resolution. The path width may be based on a measurement error that is half the path width or the larger of the distances from the local maxima to the earliest or latest side. Optionally, the distance from the peak to the 3 dB-down point can be used if the search resolution permits such measurement. The path drift is multiplied with the uncertainty in the measurement time stamp to get an error. This error is added to the measurement error due to path width. The measurement resolution is also added to the error.

These and other features and advantages of the invention will become more apparent upon reading the following detailed description and upon reference to the accompanying drawings.

DETAILED DESCRIPTION

Figure 1:
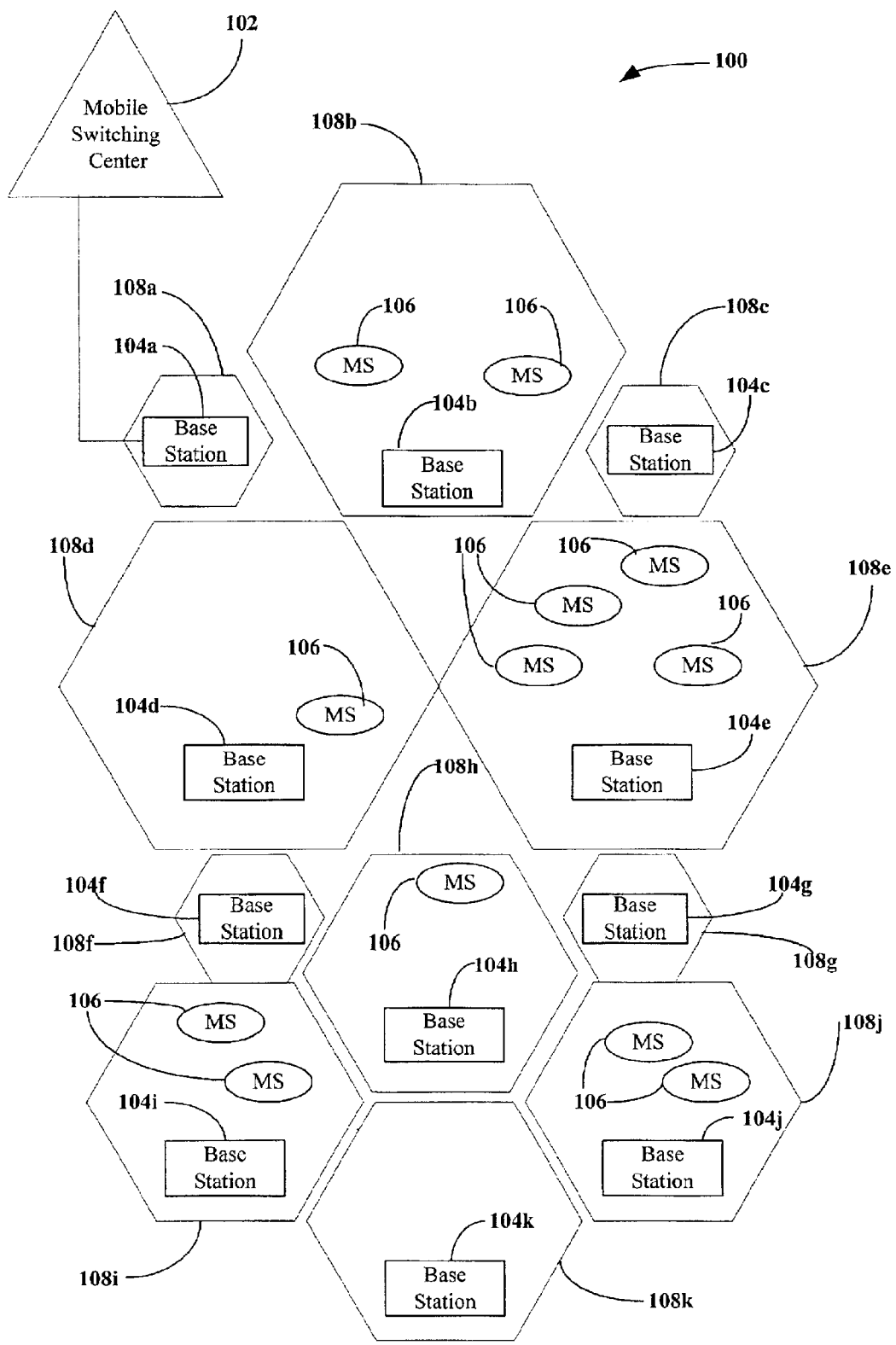
FIG. 1 illustrates components of a wireless communication system appropriate for use with an embodiment of the invention.

FIG. 1 illustrates components of an exemplary wireless communication system. A mobile switching center 102 communicates with base stations 104a–104k (only one connection shown). The base stations 104*a*–104*k* (generally 104) broadcasts data to and receives data from mobile stations 106 within cells 108*a*–108*k* (generally 108). The cell 108 is a geographic region, roughly hexagonal, having a radius of up to 35 kilometers or possibly more.

A mobile station 106 is capable of receiving data from and transmitting data to a base station 104. In one embodiment, the mobile station 106 receives and transmits data according to the Code Division Multiple Access (CDMA) standard. CDMA is a communication standard permitting mobile users of wireless communication devices to exchange data over a telephone system wherein radio signals carry data to and from the wireless devices.

Under the CDMA standard, additional cells 108*a*, 108*c*, 108*d*, and 108*e* adjacent to the cell 108*b* permit mobile stations 106 to cross cell boundaries without interrupting communications. This is so because base stations 104*a*, 104*c*, 104*d*, and 104*e* in adjacent cells assume the task of transmitting and receiving data for the mobile stations 106. The mobile switching center 102 coordinates all communication to and from mobile stations 106 in a multi-cell region. Thus, the mobile switching center 102 may communicate with many base stations 104.

Mobile stations 106 may move about freely within the cell 108 while communicating either voice or data. Mobile stations 106 not in active communication with other telephone system users may, nevertheless, scan base station 104 transmissions in the cell 108 to detect any telephone calls or paging messages directed to the mobile station 106.

One example of such a mobile station 106 is a cellular telephone used by a pedestrian who, expecting a telephone call, powers on the cellular telephone while walking in the cell 108. The cellular telephone scans certain frequencies (frequencies known to be used by CDMA) to synchronize communication with the base station 104. The cellular telephone then registers with the mobile switching center 102 to make itself known as an active user within the CDMA network.

When detecting a call, the cellular telephone scans data frames broadcast by the base station 104 to detect any telephone calls or paging messages directed to the cellular telephone. In this call detection mode, the cellular telephone receives, stores and examines paging message data, and determines whether the data contains a mobile station identifier matching an identifier of the cellular telephone. If a match is detected, the cellular telephone establishes a call with the mobile switching center 102 via the base station 104. If no match is detected, the cellular telephone enters an idle state for a predetermined period of time, then exits the idle state to receive another transmission of paging message data.

CDMA phase offsets may be used for geo-location purposes. The use of CDMA phase offsets for geo-location consists of computing a forward-link Trilateration solution. The phase tracking operation for geo-location purposes is based on mobile velocity and base station proximity. Later paths are signal paths that follow a longer path and thus arrive at the mobile station later than other paths. The earliest path is typically a line-of-sight path which is a straight-line path from the transmitter to the receiver.

Figure 2:
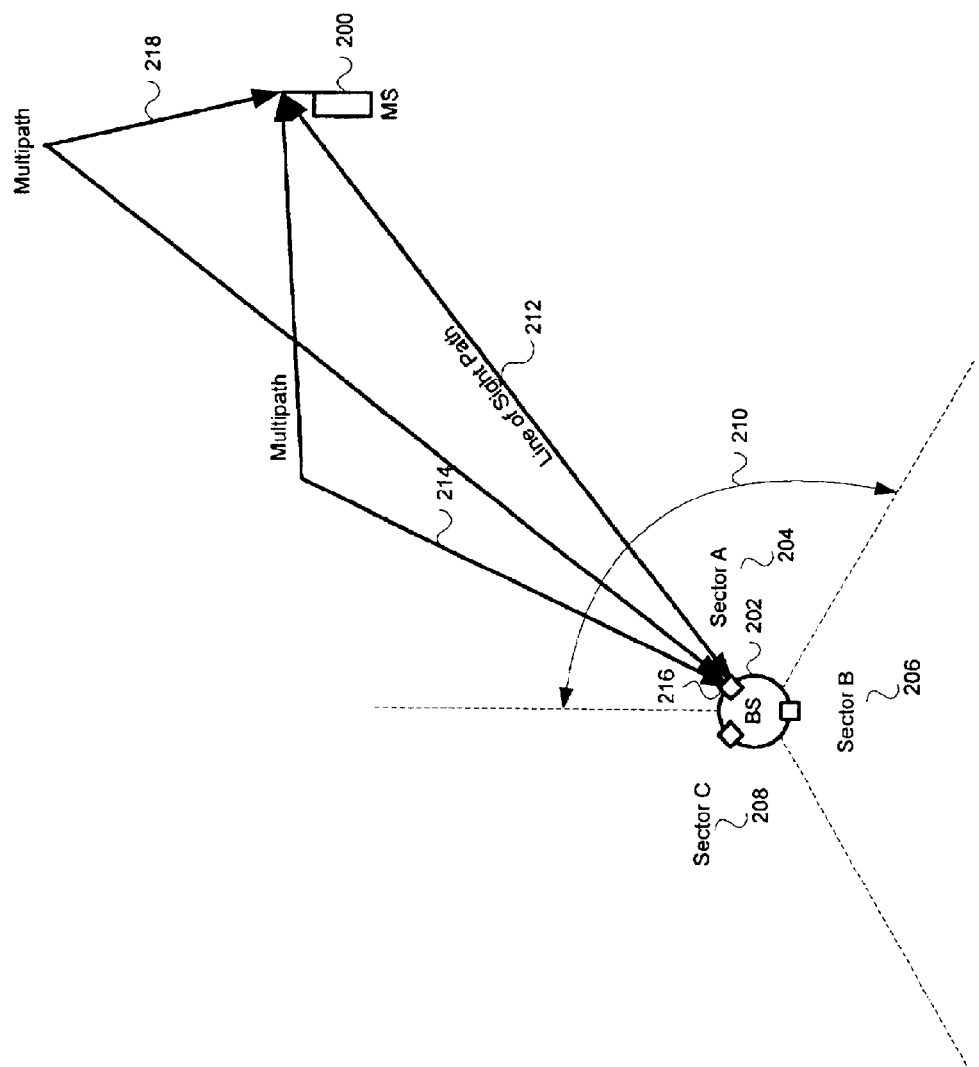
FIG. 2 illustrates communication between a base station and a mobile station having multiple communication paths.

FIG. 2 illustrates communication between a base station and a mobile station having multiple communication paths. Due to blocking or suppression of the line-of-site path 212, other multipaths due to reflections may be stronger than the direct line-of-sight path. For example, a sector A transmitter (214) may transmit a signal for a mobile station 200 in sector A 204 defined by the angle 210. The multipath signals 214, 218 are likely to be delayed from the signal traveling along the direct link of sight path 212.

Figure 3:
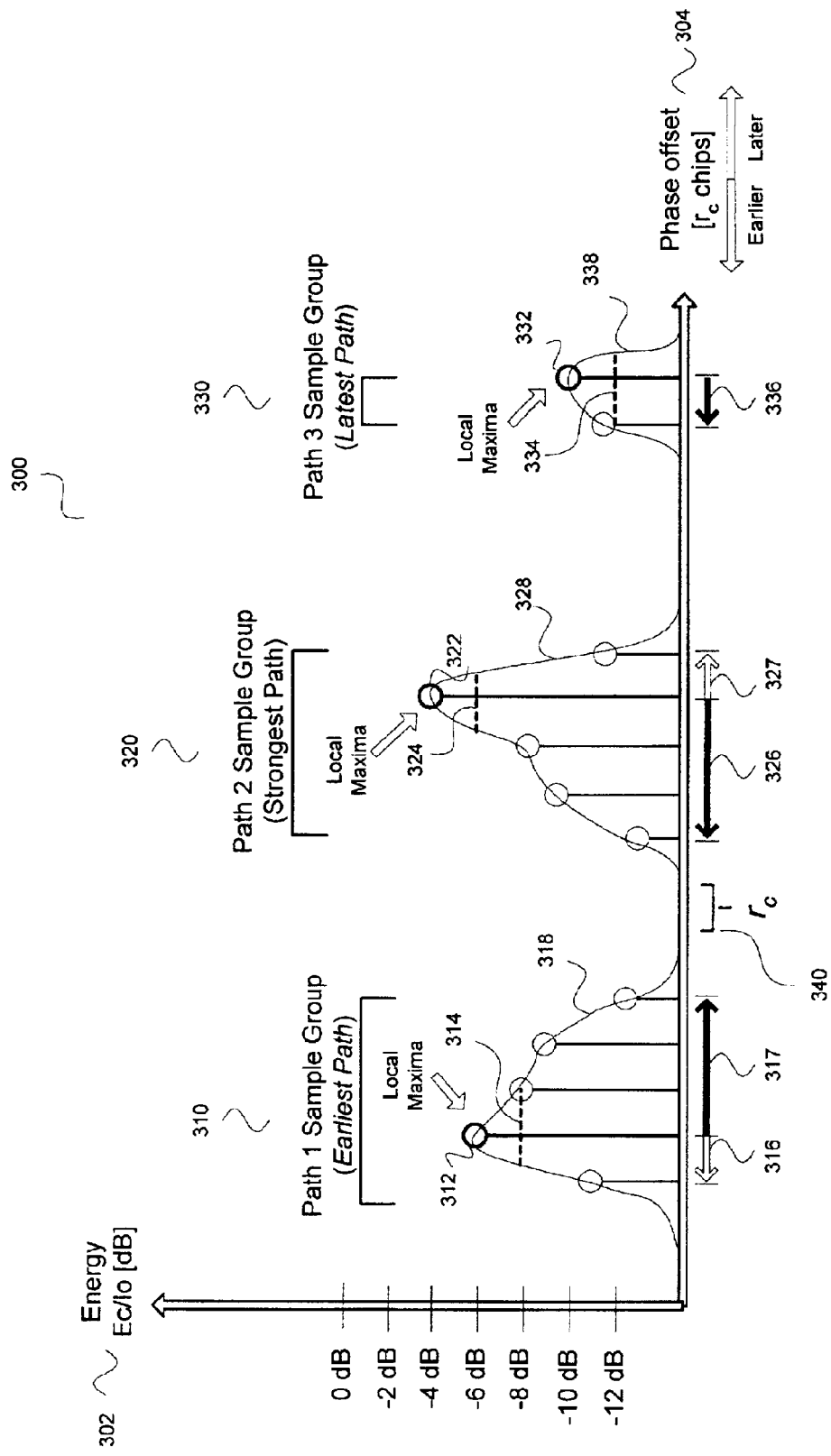
FIG. 3 illustrates an energy profile of each of the communication paths of FIG. 2.

FIG. 3 illustrates an energy profile 300 of each of a plurality of communication paths 310, 320, 330. The energy profile 300 is measured as the energy 302 as a function of the phase offset 304. The pilot phase measurement RMSE can be directly computed from the energy profile using the path width as measured by the searcher component of the modem. The path width is defined as the distance (in chips) between the earliest offset that resulted in a significant correlation result and latest offset that resulted in a significant correlation result where all measurements in between were significant (i.e. above a certain threshold energy). Optionally, the path may be considered to be a set of consecutive points 318, 328, 338 with only one local maxima 312, 322, 332. The phase measurement error is +/− half the path width or the larger of the distances from the local maxima to the earliest 316, 326, 336 or latest 317, 327, 337 side. Optionally, the distance from the peak to the 3 dB-down point 314, 324, 334 can be used if the search resolution 340 permits such measurement. This path width error may be represented in psuedo code as follows:

Path Width = $f$ (earliest phase offset, latest phase offset, local maxima, 3 db down point)

= $\frac{1}{2}$|latest − earliest|, or

= max(|local maxima − earliest|, |local maxima − latest|), or

= max(|local maxima − 3 dB down left|, |local maxima − 3dB down right|).

The selection of which technique to use to compute the path width error may vary based on the current conditions. The mobile station 106 may be programmed to select a measurement technique.

Figure 4:
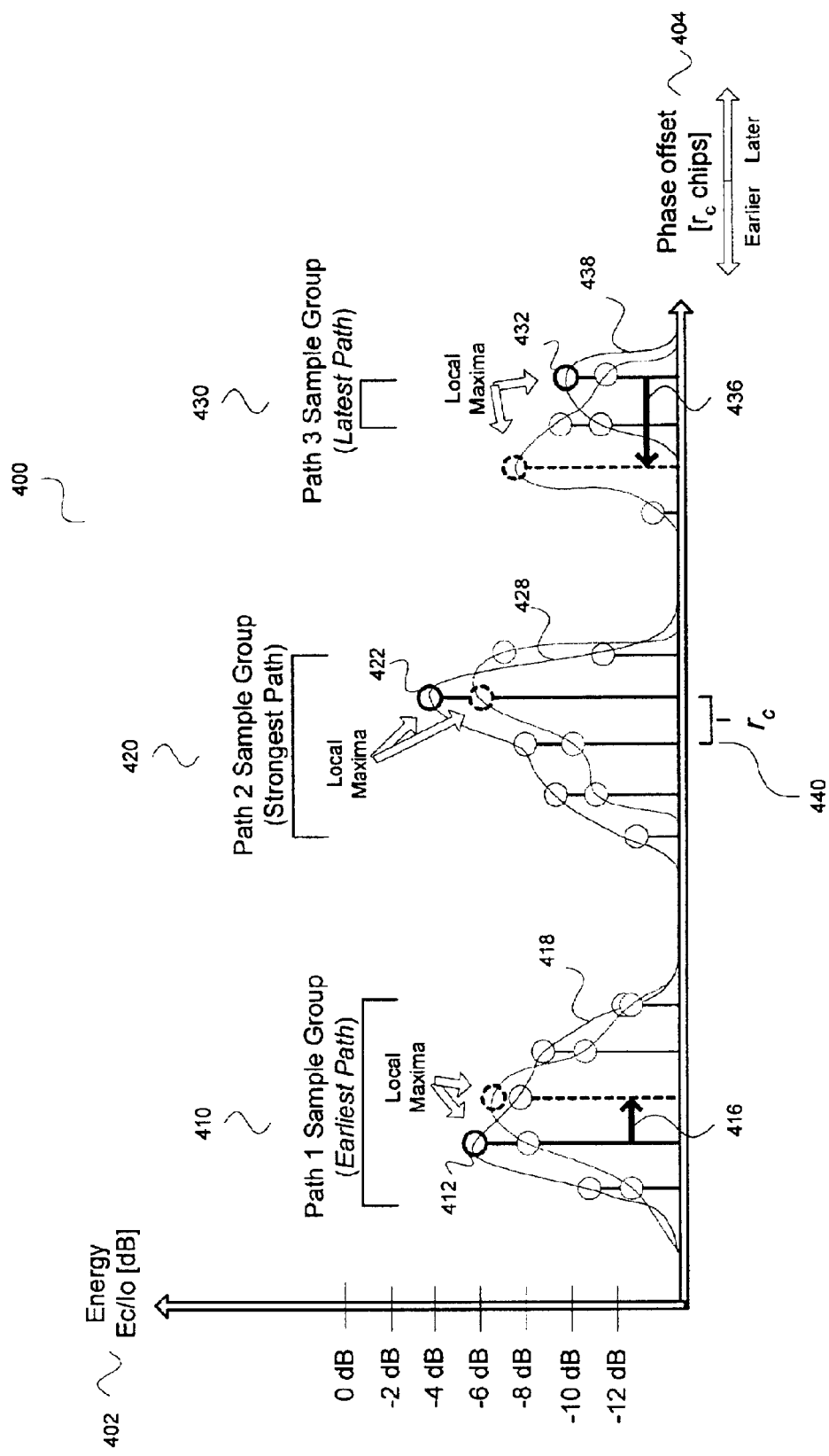
FIG. 4 illustrates an energy profile including a time delta of each of the communication paths of FIG. 2.

FIG. 4 illustrates an energy profile 400 including a time delta of each of the communication paths 410, 420, 430. The energy profile 400 is measured as the energy 402 as a function of the phase offset 404. For each path 410, 420, 430, the energy profiles at a first time period 418, 428, 438 are measured, with each energy profile having a local maxima 412, 422, 432. After a period of time has elapsed, the energy profiles are again measured, and any drift 416, 436 in the local maxima is determined. The differences in the energy profiles over time is used to calculate the path drift. The path drift may be represented by psuedo code as follows:

Path drift = $f$ (rake receiver finger(s), search element results finger path tracking rate, earliest phase rate of change, path rate of change)

= finger($i$) position($t$) − finger($i$)position($t$ − 1), or;

= searcher path($i$)peak pos($t$) − searcher path ($i$) peak pos ($t$ − 1), or;

= same but average of all paths, or;

= same but for earliest path only, or;

-continued

= same but for strongest path only, or;

= speed of mobile in direction of BS(t), or;

= finger path maxima tracking rate defined by standard.

The path drift over time is combined with the uncertainty, in time, of the measurement time-stamp. The path drift (chips/second) is multiplied with the uncertainty in measurement time stamp to get an error (in chips). This error is added to the measurement error due to path width. As the measurement gets older (stale), the path drift may optionally be multiplied by an age factor (the age in seconds) to get an expanded uncertainty. It is preferable to transmit the original error calculation with a time stamp of the measurement.

Figure 5:
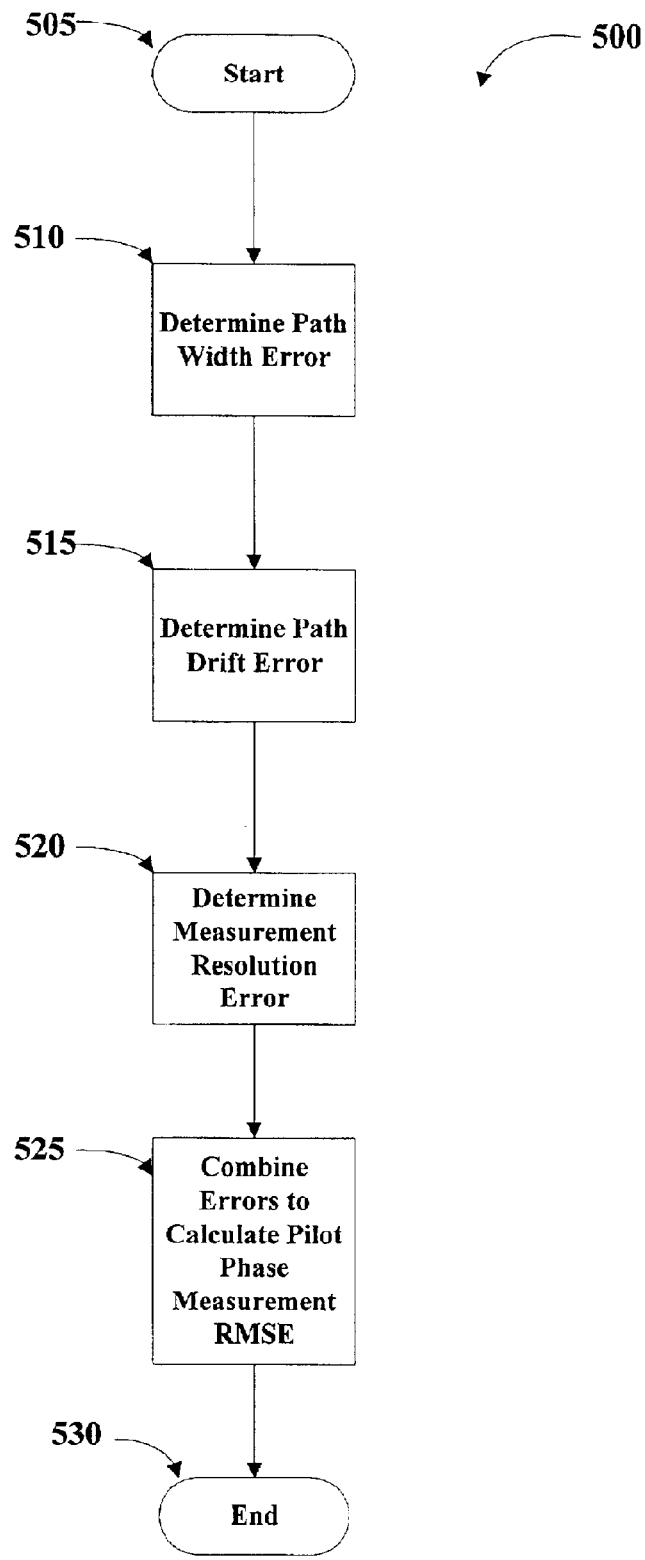
FIG. 5 illustrates a process for determining the pilot phase measurement root mean-square error.

FIG. 5 illustrates a process 500 for determining the pilot phase measurement root mean-square error. The process 500 begins in a START block 505. Proceeding to block 510, the process 500 determines the path width error. As stated above, the path width error is the distance between the earliest offset that resulted in a significant correlation result and latest offset that resulted in a significant correlation result where all measurements in between were significant. The path width error may be calculated using a variety of different techniques, including using the distance from the peak to the 3 dB down point.

Proceeding to block 515, the process 500 determines the path drift error. The path drift error may be computed using differences in the energy profiles over time. The path drift may also be multiplied by an age factor.

Proceeding to block 520, the process 500 determines the measurement resolution error. The measurement resolution may be as poor as ½ chip. The measurement resolution may be represented in pseudo code as follows:

Measurement Resolution = f(searcher resolution, finger position resolution)

= searcher offset resolution, or;

= searcher sweep step resolution, or;

= finger position resolution.

Proceeding to block 525, the process 500 combines the path width, the path drift, and the measurement resolution to determine the pilot phase measurement RMSE. The combination of the path width, the path drift, and the measurement resolution may be represented in pseudo code as follows:

Error=Path width error+error due to path drift+ measurement resolution error, or Error=Square_root[(path width error)$^2$+(error due to path drift)$^2$+(meaurement resolution error)$^2$]

Error due to path width=coefficient$_1$×path width

Error due to path drift=path drift rate×(uncertainty in time+age)

Error due to measurement resolution=coefficient$_2$× measurement resolution.

Once the pilot phase measurement RMSE is calculated, the process 500 terminates in END block 530.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method of estimating a pilot phase root mean square error comprising:

determining a path width error;

determining a path drift error;

determining a measurement resolution error; and combining the path width error, the path drift error, and the measurement resolution error to obtain a pilot phase root mean square error estimate.

2. The method of claim 1, further comprising calculating the path width error using a distance from a peak to a 3 dB down point.

3. The method of claim 1, further comprising calculating the path width error using a distance from a local maxima to an earliest or a latest side.

4. The method of claim 1, further comprising calculating the path width error using half the path width.

5. The method of claim 1, further comprising multiplying a path drift with an uncertainty in a measurement time stamp to obtain a time error.

6. The method of claim 5, further comprising adding the time error to the path drift to obtain the path width error.

7. The method of claim 1, further comprising reporting the pilot phase root mean square error to a base station.

8. A wireless communication system comprising:

a base station which transmits a pilot signal; and a mobile station which receives the pilot signal and estimates a pilot phase measurement root mean square error using a path width, a path drift, and a measurement resolution.

9. The wireless communication system of claim 8, wherein the mobile station reports the pilot phase measurement root mean square error to the base station.

10. The mobile station of claim 9, wherein the mobile station reports according to IS-801.

11. The wireless communication system of claim 8, wherein the path width is a distance between an earliest offset that resulted in a significant correlation result and a latest offset that resulted in a significant correlation result where all measurements in between were above a threshold energy.

12. The wireless communication system of claim 8, wherein the path width is measured to encompass a set of consecutive points with only one local maxima.

13. The wireless communication system of claim 8, wherein a phase measurement error is calculated as +/– half the path width.

14. The wireless communication system of claim 8, wherein a phase measurement error is calculated as a larger of a first distance from a local maxima to an earliest side or a second distance from a local maxima to a latest side.

15. The wireless communication system of claim 8, wherein a phase measurement error is calculated as a distance from a peak to a point measured a pre-determined amount down from the peak.

16. The wireless communication system of claim 15, wherein the pre-determined amount down from the peak is 3 dB.

17. The wireless communication system of claim 8, wherein the path drift is multipled with an uncertainty in a measurement time stamp to obtain an path width error.

18. The wireless communication system of claim 17, wherein the path width error is reported with a time stamp of the measurement.

19. The wireless communication system of claim 17, pilot phase measurement root mean square error combines the path width, the path drift, and the measurement resolution.

* * * * *